(12) United States Patent
Noro

(10) Patent No.: US 10,773,207 B2
(45) Date of Patent: Sep. 15, 2020

(54) CONDUCTIVE HONEYCOMB STRUCTURE

(71) Applicant: NGK INSULATORS, LTD., Nagoya-Shi (JP)

(72) Inventor: Takashi Noro, Nagoya (JP)

(73) Assignee: NGK Insulators, Ltd., Nagoya-Shi (JP)

( * ) Notice: Subject to any disclaimer, the term of this patent is extended or adjusted under 35 U.S.C. 154(b) by 213 days.

(21) Appl. No.: 15/938,198

(22) Filed: Mar. 28, 2018

(65) Prior Publication Data

US 2018/0280872 A1 Oct. 4, 2018

(30) Foreign Application Priority Data

Mar. 31, 2017 (JP) ................................. 2017-073009

(51) Int. Cl.
*B01D 53/86* (2006.01)
*B01J 35/04* (2006.01)
(Continued)

(52) U.S. Cl.
CPC .............. *B01D 53/86* (2013.01); *B01J 35/04* (2013.01); *B01J 37/08* (2013.01); *B23K 1/0014* (2013.01); *B23K 26/21* (2015.10); *B23K 35/02* (2013.01); *B23K 35/0244* (2013.01); *C04B 35/565* (2013.01); *C04B 35/58092* (2013.01); *C04B 35/6263* (2013.01); *C04B 35/6316* (2013.01); *C04B 37/02* (2013.01); *C04B 37/025* (2013.01); *C04B 38/0009* (2013.01); *C04B 38/0012* (2013.01); *C04B 41/009* (2013.01); *C04B 41/52* (2013.01); *C04B 41/89* (2013.01); *F01N 3/2013* (2013.01); *F01N 3/2828* (2013.01); *B23K 2101/38* (2018.08); *C04B 2111/0081* (2013.01);
(Continued)

(58) Field of Classification Search
None
See application file for complete search history.

(56) References Cited

U.S. PATENT DOCUMENTS

2015/0270026 A1 9/2015 Izumi et al.

FOREIGN PATENT DOCUMENTS

JP H10-241753 9/1998
JP 2002-009190 1/2002
(Continued)

OTHER PUBLICATIONS

Ito et al., machine translation of JP 2011-212577, Oct. 27, 2011 (Year: 2011).*

(Continued)

*Primary Examiner* — Humera N. Sheikh
*Assistant Examiner* — Mary I Omori
(74) *Attorney, Agent, or Firm* — Burr & Brown, PLLC

(57) ABSTRACT

A conductive honeycomb structure, comprising: a columnar ceramic honeycomb structure portion comprising an outer peripheral side wall and partition walls each disposed inside the outer peripheral side wall and defining a plurality of cells penetrating from one bottom surface to another bottom surface to form flow paths; a pair of electrode layers disposed on an outer surface of the outer peripheral side wall across a central axis of the honeycomb structure portion; and a pair of metal terminals joined to the respective electrode layers via one or more welded portions, wherein each of the one or more welded portions comprises a welded area of from 2 to 50 mm$^2$.

6 Claims, 4 Drawing Sheets

(51) Int. Cl.
  *B01J 37/08*  (2006.01)
  *B23K 35/02*  (2006.01)
  *C04B 38/00*  (2006.01)
  *B23K 1/00*  (2006.01)
  *C04B 37/02*  (2006.01)
  *C04B 41/89*  (2006.01)
  *C04B 35/63*  (2006.01)
  *C04B 41/52*  (2006.01)
  *F01N 3/20*  (2006.01)
  *C04B 35/626*  (2006.01)
  *C04B 41/00*  (2006.01)
  *C04B 35/58*  (2006.01)
  *C04B 35/565*  (2006.01)
  *F01N 3/28*  (2006.01)
  *B23K 26/21*  (2014.01)
  *C04B 111/00*  (2006.01)
  *C04B 111/94*  (2006.01)
  *B23K 101/38*  (2006.01)

(52) U.S. Cl.
  CPC ... *C04B 2111/94* (2013.01); *C04B 2235/3826* (2013.01); *C04B 2235/3891* (2013.01); *C04B 2235/428* (2013.01); *C04B 2235/5436* (2013.01); *C04B 2235/665* (2013.01); *C04B 2235/96* (2013.01); *C04B 2235/9607* (2013.01); *C04B 2237/08* (2013.01); *C04B 2237/365* (2013.01); *C04B 2237/406* (2013.01); *C04B 2237/706* (2013.01); *C04B 2237/708* (2013.01)

(56) References Cited

FOREIGN PATENT DOCUMENTS

| JP | 2011212577 A | * | 10/2011 | ............. B01J 35/04 |
|----|--------------|---|---------|--------------------------|
| JP | 2011-246340 A1 | | 12/2011 | |
| JP | 2015-081531 | | 4/2015 | |
| JP | 2015-193528 | | 11/2015 | |

OTHER PUBLICATIONS

Japanese Office Action (Application No. 2017-073009) dated Jun. 18, 2019 (with English translation).

* cited by examiner

[FIG. 1]
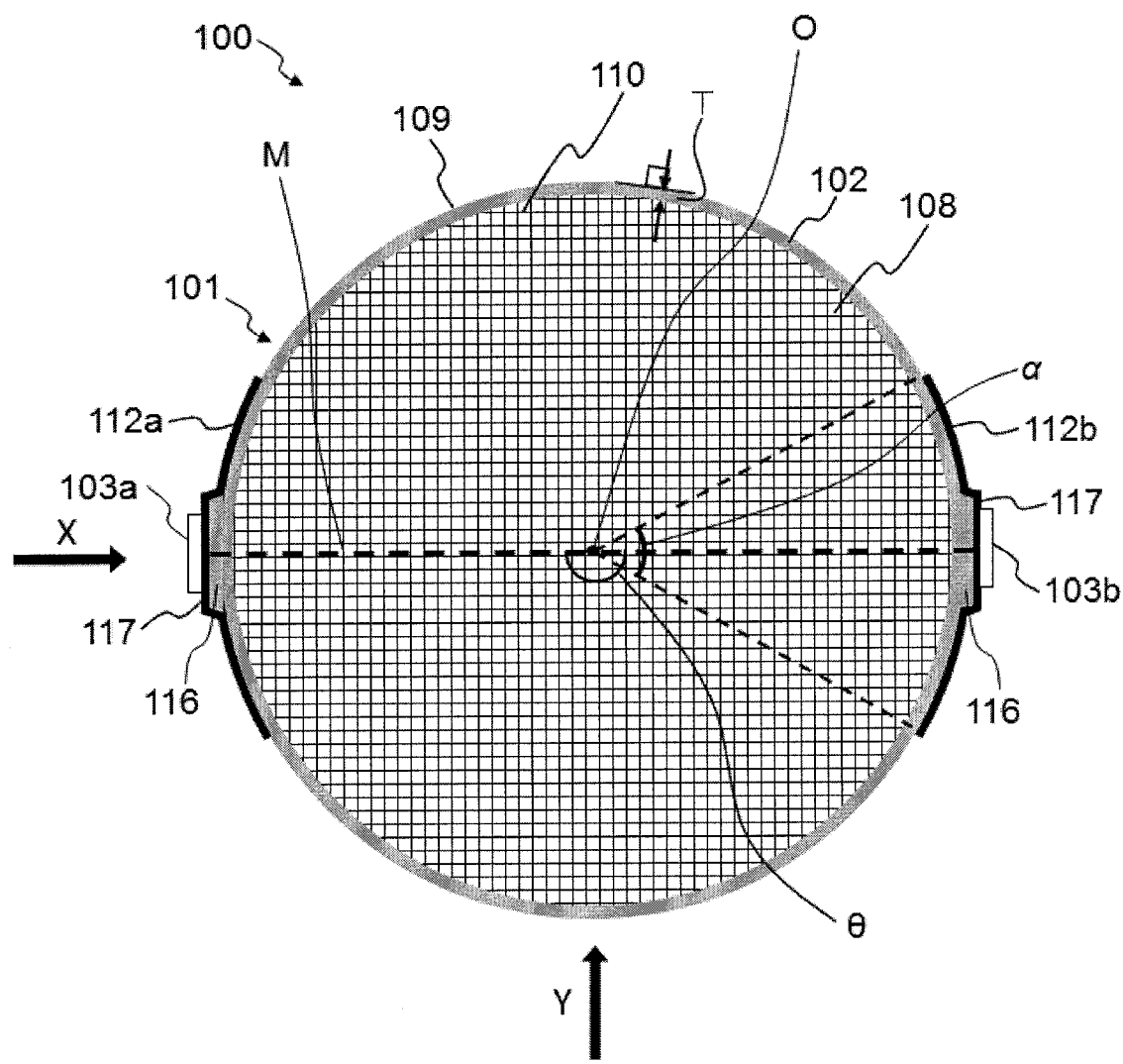

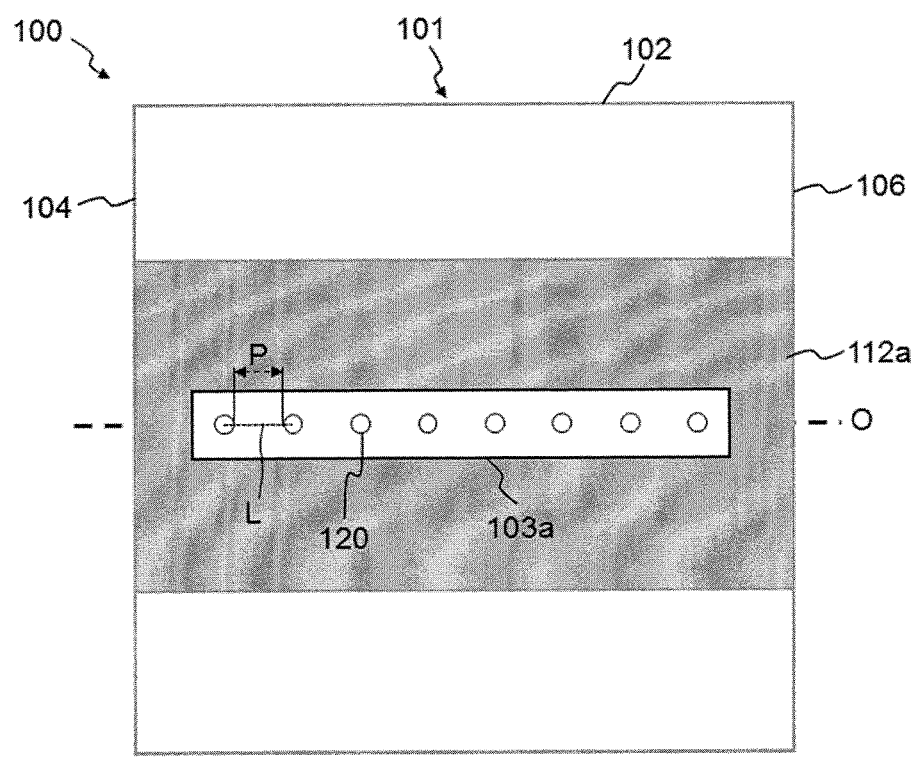
[FIG. 2]

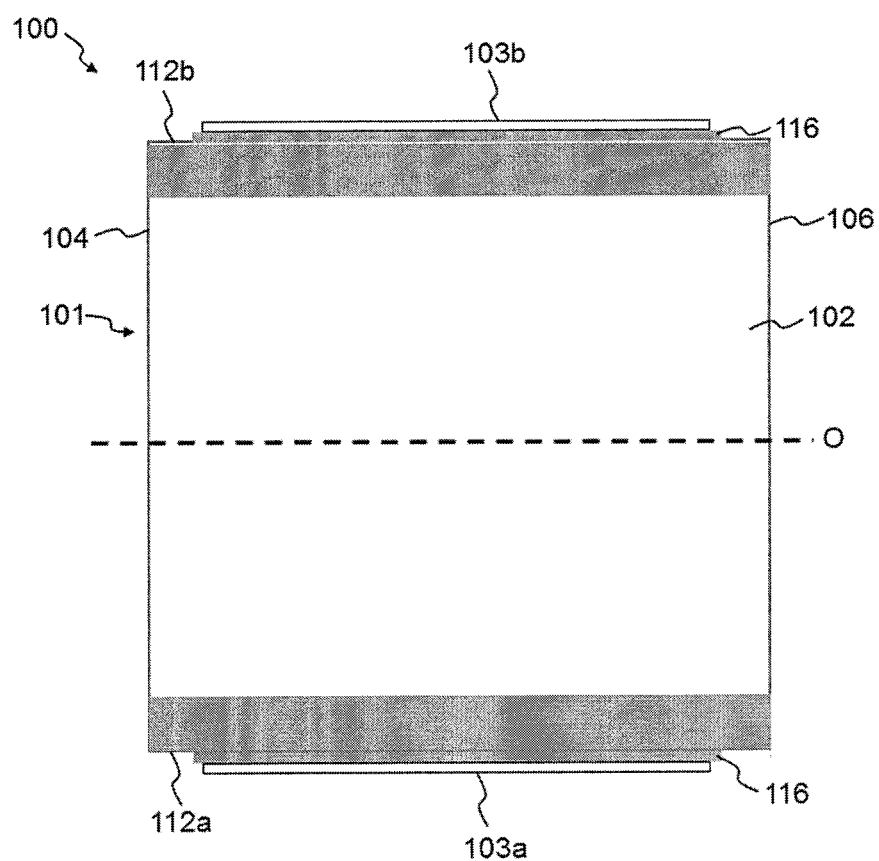
[FIG. 3]

[FIG. 4]
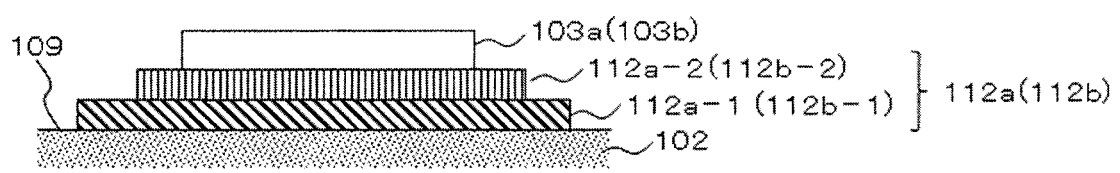

CONDUCTIVE HONEYCOMB STRUCTURE

TECHNICAL FIELD

The present invention relates to a conductive honeycomb structure. More particularly, it relates to a honeycomb structure that is suitable for use in application of supporting a catalyst for exhaust gas purification and rapidly increasing a temperature to an activation temperature of the catalyst.

BACKGROUND ART

Conventionally, a catalyst supported on a columnar honeycomb structure including a plurality of partition walls that partition and form a plurality of cells penetrating from one bottom surface to the other bottom surface to form flow paths is used for purifying harmful substances such as HC, CO, and NOx contained in an exhaust gas discharged from an engine of a motor vehicle or the like. Thus, when treating the exhaust gas with the catalyst supported on the honeycomb structure, a temperature of the catalyst should be increased to its activation temperature. However, there is a problem that since the catalyst does not reach the activation temperature at starting of the engine, the exhaust gas is not sufficiently purified. In particular, a plug-in hybrid electric vehicle (PHEV) and a hybrid vehicle (HV) sometimes run only with the motor for its traveling, so that they have lower engine starting frequency and lower catalyst temperature at starting of the engine, thereby tending to deteriorate the exhaust gas purification performance immediately after the engine is started.

In order to solve the problem, an electric heating catalyst (EHC) has been proposed. The EHC is configured to be capable of heating the catalyst to the activation temperature before starting of the engine by connecting a pair of terminals to a columnar honeycomb structure made of conductive ceramics and causing the honeycomb structure itself to generate heat by applying electric current. In the EHC, it is desired to provide a uniform temperature distribution by reducing temperature variation within the honeycomb structure in order to obtain a sufficient catalytic effect.

The terminal is generally made of a metal, and the material of the terminal is different from that of the honeycomb structure made of a ceramic. Therefore, for the applications for use at an elevated temperature in an oxidizing atmosphere such as the inside of an exhaust pipe of a motor vehicle, reliability of mechanical and electrical joining between the honeycomb structure and the terminal in an elevated temperature environment is required. Japanese Patent Application Publication No. 2011-246340 A (Patent Document 1) discloses that a pair of electrodes made of a metal layer is provided on a surface of a honeycomb body made of a porous ceramic based on silicon carbide.

The metal layer is comprised of a surface metal layer containing at least Cr and Fe composed essentially of Cr or Fe and a diffusion layer made of a metal silicide formed at a boundary portion with the honeycomb body. The metal layer is diffusion-bonded to the honeycomb body by the diffusion layer made of the metal silicide. Patent Document 1 discloses that a difference of a coefficient of thermal expansion between the honeycomb body and the metal layer can be reduced, so that thermal stress between the honeycomb body and the metal body can be reduced even in an elevated temperature environment and reliability of mechanical joining can be sufficiently ensured.

The honeycomb structure disclosed in Patent Document 1 is produced by heating a honeycomb structure while placing an alloy containing at least Cr and Fe and composed essentially of Cr or Fe on the surface of the honeycomb body. Patent Document 1 discloses that the placing of the alloy on the surface of the honeycomb structure can be performed by, for example, thermal spraying, plating, transfer sheet, printing, dispenser, ink jet, brush coating, vapor deposition, metal foil or the like. It also discloses that the heating in the electrode forming step is preferably carried out in vacuum or in an inert gas, in terms of preventing oxidation of the electrode. Examples of Patent Document 1 disclose that a paste of metal powder composed of each metal electrode material is applied to the surface of the ceramic body, degreased at a temperature of 400° C., and heated at a temperature of 1200° C. for 60 minutes in vacuum.

CITATION LIST

Patent Literature

Japanese Patent Application Publication No. 2011-246340 A

SUMMARY OF INVENTION

Technical Problem

In the art disclosed in Patent Document 1, the metal layer containing Fe is used as an electrode. However, the Fe-based metal has larger thermal expansion and distortions is occurred between the ceramic and the metal during cooling after heating, resulting in increased thermal stress. Therefore, the problem of joint reliability such as cracks generated near the joint portion between the honeycomb body and the metal layer and easy separation of the metal layer has not been completely solved, and there is still room for improvement. In particular, as the joined area between the honeycomb body and the metal layer is increased, the problem of cracking and separation will also become severer. Further, what is specifically disclosed in Patent Document 1 is only a method for diffusion bonding of the honeycomb body to the metal layer by heating them at an elevated temperature for a long period of time in vacuum or in an inert gas. However, such a method would increase production costs The present invention has been made in view of the above circumstances, and an object of the present invention is to provide a conductive honeycomb structure having improved joint reliability with terminals by means of a solution different from that of prior art.

Solution to Problem

The inventor of the present invention has conducted intensive studies to solve the above problems, and has found that it is effective to connect a honeycomb structure to metal terminals by means of the following technique:

(1) the honeycomb structure and the terminals are joined while interposing the electrode layer therebetween;

(2) welding is performed by applying thermal energy from the terminal side; and (3) for the welding, a limitation is set on the size of each welded portion.

The present invention has been completed on the basis of such findings. In one aspect, the present invention provides a conductive honeycomb structure, comprising: a columnar ceramic honeycomb structure portion comprising an outer peripheral side wall and partition walls each disposed inside the outer peripheral side wall and defining a plurality of cells penetrating from one bottom surface to another bottom surface to form flow paths;

a pair of electrode layers disposed on an outer surface of the outer peripheral side wall across a central axis of the honeycomb structure portion; and a pair of metal terminals joined to the respective electrode layers via one or more welded portions, wherein each of the one or more welded portions comprises a welded area of from 2 to 50 mm$^2$.

In one embodiment of the conductive honeycomb structure according to the present invention, when two or more welded portions are present for each metal terminal, a relationship of $P \geq \{(A_1+A_2)/2\}/10$ is satisfied, in which $A_1$ and $A_2$ each represents a welded area of the welded portions adjacent to each other, and P represents a distance between the welded portions adjacent to each other.

In another embodiment of the conductive honeycomb structure according to the present invention, it comprises a total welded area of the one or more welded portions of 2 mm$^2$ or more and 120 mm$^2$ or less for each of the metal terminals.

In yet another embodiment of the conductive honeycomb structure according to the present invention, each electrode layer comprises a stacked structure comprising a first electrode layer that is in contact with the outer surface of the outer peripheral side wall of the honeycomb structure portion, and a second electrode layer that is in contact with one of the metal terminals, the second electrode layer being a stress relaxation layer.

In yet another embodiment of the conductive honeycomb structure according to the present invention, a relational expression of A<B<C is satisfied, in which A represents a coefficient of thermal expansion of the first electrode layer, B represents a coefficient of thermal expansion of the second electrode layer and C represents a coefficient of thermal expansion of the one of the metal terminals.

In yet another embodiment of the conductive honeycomb structure according to the present invention, the second electrode layer has a Young's modulus of from 2 to 50 GPa.

Advantageous Effects of Invention

According to the present invention, it is possible to provide a conductive honeycomb structure having improved joint reliability of terminals. The conductive honeycomb structure according to the present invention can be produced without carrying out a heat treatment in vacuum or in an inert gas at an elevated temperature for a long period of time, so that the conductive honeycomb structure can contribute to shortening of the production time and reduction of costs. Further, according to the present invention, the welded area per welded portion is smaller, so that cracking or separation due to a thermal expansion difference is less liable to occur.

When two or more welded portions are provided, it is possible to produce an effect capable of reducing repeated fatigue of the ceramic honeycomb structure portion due to thermal cycling by maintaining a distance between the adjacent welded portions at a certain level or more, depending on the welded areas of the welded portions.

When the stress relieving layer is provided in the electrode layer, it is possible to further reduce breakage during welding and repeated fatigue of the ceramic honeycomb structure portion due to thermal cycling.

BRIEF DESCRIPTION OF DRAWINGS

FIG. 1 is a schematic cross-sectional view of a honeycomb structure according to one embodiment of the present invention as observed from a direction perpendicular to flow paths of cells.

FIG. 2 is a schematic side view of the honeycomb structure according to the embodiment shown in FIG. 1 as observed from a direction of an arrow X.

FIG. 3 is a schematic side view of the honeycomb structure according to the embodiment shown in FIG. 1 as observed from a direction of an arrow Y.

FIG. 4 is a schematic view for explaining a stacked structure of electrode layer of a honeycomb structure according to the present invention.

DESCRIPTION OF EMBODIMENTS

Embodiments for carrying out the present invention will now be described in detail with reference to the drawings. It should be understood that the present invention is not intended to be limited to the following embodiments, and any change, improvement or the like of the design may be appropriately added on the basis of ordinary knowledge of those skilled in the art without departing from the spirit of the present invention.

<1. Conductive Honeycomb Structure>

FIG. 1 shows a schematic cross-sectional view of a honeycomb structure 100 according to one embodiment of the present invention as observed from a direction perpendicular to flow paths of cells. FIG. 2 shows a schematic side view of the honeycomb structure 100 according to the embodiment shown in FIG. 1 as observed from a direction of an arrow X. FIG. 3 shows a schematic side view of the honeycomb structure 100 according to the embodiment shown in FIG. 1 as observed from a direction of an arrow Y.

The conductive honeycomb structure 100 includes a columnar ceramic honeycomb structure portion 101 comprising an outer peripheral side wall 102 and a plurality of partition walls 110 each disposed inside the outer peripheral side wall 102 and defining a plurality of cells 108 penetrating from a first bottom surface 104 to a second bottom surface 106 to form flow paths; a pair of electrode layers 112a, 112b disposed on an outer surface 109 of the outer peripheral side wall 102 across a central axis O of the honeycomb structure portion 101; and a pair of metal terminals 103a, 103b joined to the respective electrode layers 112a, 112b via one or more welded portions 120.

The conductive honeycomb structure 100 can allow generation of heat due to Joule heat generated by energization when a voltage is applied between the pair of metal terminals 103a and 103b. Therefore, the honeycomb structure 100 can be suitably used as a heater. The voltage to be applied may preferably be from 12 to 900 V, and more preferably from 64 to 600 V, but the voltage to be applied may be changed as needed. Further, the honeycomb structure 100 may be used as a catalyst body by supporting a catalyst on the honeycomb structure 100. For example, fluid such as an automobile exhaust gas can flow through the flow paths of the plurality of cells 108.

(1-1 Honeycomb Structure Portion)

The external shape of the honeycomb structure portion 101 is not particularly limited as long as it is columnar. For example, the external shape of the honeycomb structure portion 101 may be a columnar shape with circular bottoms (cylindrical shape), a columnar shape with oval bottoms, a columnar shape with polygonal bottoms (quadrangle, pentagon, hexagon, heptagon and octagon shapes, etc.), or the like. For the size of the honeycomb structure portion 101, an area of the bottom surface may preferably be from 2000 to 20000 mm$^2$, and more preferably from 5000 to 15000 mm$^2$, for the reason of improving heat resistance (preventing cracks generated in the outer wall portion in the circumferential direction).

The outer peripheral side wall 102 may include a pair of protruding portions 116 extending in the direction of the flow paths of the cells 108 across the central axis of the honeycomb structure portion 110. The respective metal terminals 103a, 103b joined to the respective electrode layers 112a, 112b can be arranged at positions where the protruding portions 116 are formed. The thickness of the portions having the pair of protruding portions 116 on the outer peripheral side wall 102 is relatively thicker, so that the electrical resistance in the axial direction will be decreases and the current flowing into the metal terminals 103a, 103b will tend to spread in the direction of the flow paths of the cells 108. This can lead to improved uniform heat generation in the axial direction of the honeycomb structure portion 110.

The shape of an upper surface 117 of each protruding portion 116 may be preferably matched to that of a joining surface of each of the metal terminals 103a, 103b to the electrode layers 112a, 112b, in terms of increasing the joint strength between the metal terminals 103a, 103b and the electrode layers 112a, 112b. For example, when the joining surfaces of the metal terminals 103a, 103b to the electrode layers 112a, 112b are flat, the upper surfaces 117 of the protruding portions 116 may also be preferably flat. Therefore, the metal terminals 103a, 103b and the electrode layers 112a, 112b are brought into close contact with each other, so that the joint strength of the welded portion(s) can be improved.

The honeycomb structure portion 101 is comprised of a ceramic having electric conductivity. The electric resistivity of the ceramic is not particularly limited as long as the honeycomb structure 100 can generate heat due to Joule heat by energization, but the electrical resistivity of the honeycomb structure 100 may preferably be from 1 to 200 Ωcm, and more preferably from 10 to 100 Ωcm. In the present invention, the electric resistivity of the honeycomb structure portion 101 is defined as a value measured at 400° C. by a four-terminal method.

The ceramics for forming the honeycomb structure portion 101 include oxide based ceramics such as alumina, mullite, zirconia and cordierite, non-oxide based ceramics such as silicon carbide, silicon nitride and aluminum nitride. Also, silicon carbide-metal silicon composite materials, silicon carbide-graphite composite materials and the like may be used. The material of the honeycomb structure portion 101 may preferably be a ceramic based on a silicon-silicon carbide composite material or silicon carbide, and more preferably a silicon-silicon carbide composite material or silicon carbide, in terms of compatibility of heat resistance and electrical conductivity. The phrase "the material of the honeycomb structure portion 101 is based on a silicon-silicon carbide composite material" as used herein means that 90% by mass or more of the whole honeycomb structure portion 101 contains the silicon-silicon carbide composite material (total mass). Here, the silicon-silicon carbide composite material contains silicon carbide particles as an aggregate and silicon as a binder for bonding the silicon carbide particles to each other, and it is preferable that the silicon carbide particles are bonded by silicon such that pores are formed between the silicon carbide particles. The phrase "the material of the honeycomb structure portion 101 is based on silicon carbide" as used herein means that 90% by mass or more of the whole honeycomb structure portion 101 contains silicon carbide (total mass).

When the material of the honeycomb structure portion 101 is the silicon-silicon carbide composite material, a ratio of the "mass of the silicon carbide particles as a binder" contained in the honeycomb structure portion 101 to the total of the "mass of the silicon carbide particles as an aggregate" contained in the honeycomb structure portion 101 and the "mass of silicon as a binder" contained in the honeycomb structure portion 101 may preferably be from 10 to 40% by mass, and more preferably from 15 to 35% by mass. If it is lower than 10% by mass, the strength of the honeycomb structure portion 101 may be decreased. If it is higher than 40% by mass, the shape may not be retained during firing.

The shape of the cell in the cross section perpendicular to the flow path direction of the cells includes, but not limited to, preferably a quadrangle, a hexagon, an octagon, or a combination thereof. Among them, quadrangle and hexagon are preferable. Such a cell shape will result in decreased pressure loss when allowing an exhaust gas to flow through the honeycomb structure, thereby providing improved purification performance of the catalyst. The rectangle is particularly preferable from the viewpoint of tending to achieve both of the structural strength and the heating uniformity.

The thickness of the partition walls 110 for partitioning and forming the cells 108 may preferably be from 0.1 to 0.3 mm, and more preferably from 0.15 to 0.25 mm. The thickness of the partition walls 110 of 0.1 mm or more will allow suppression of a decrease in the strength of the honeycomb structure. The thickness of the partition walls 110 of 0.3 mm or less will allow suppression of an increase in pressure loss during flowing of an exhaust gas when the catalyst is supported using the honeycomb structure as a catalyst carrier. In the present invention, the thickness of each partition wall 110 is defined as a length of a portion crossing the partition wall 110, of a line segment connecting the centers of gravity of adjacent cells 108, in the cross section perpendicular to the flow path direction of the cells 108.

In the cross section perpendicular to the flow path direction of the cells 108, the honeycomb structure 100 may preferably have a cell density of from 40 to 150 cells/cm$^2$, and more preferably from 70 to 100 cells/cm$^2$. The cell density in such a range will allow the purification performance of the catalyst to be improved while reducing the pressure loss during flowing of the exhaust gas. If the cell density is lower than 40 cells/cm$^2$, the catalyst supporting area may be reduced. If the cell density is higher than 150 cells/cm$^2$, the pressure loss during flowing the exhaust gas may become large when the catalyst is supported using the honeycomb structure 100 as a catalyst carrier. The cell density is a value obtained by dividing the number of cells by the area of one bottom surface portion of the honeycomb structure portion 101 excluding the outer wall 102 portion.

Providing the outer peripheral side wall 102 of the honeycomb structure 100 is useful in terms of ensuring the structural strength of the honeycomb structure 100 and preventing the fluid flowing through the cells 108 from leaking from the outer peripheral side surface 102. More particularly, a thickness T of the outer peripheral side wall 102 may preferably be 0.1 mm or more, and more preferably 0.15 mm or more, and still more preferably 0.2 mm or more. However, if the thickness of the outer peripheral side wall 102 is excessively high, the strength will become too high, so that balance between strengths of the outer peripheral side wall 102 and the partition walls 110 will be lost and thermal shock resistance will be decreased. Therefore, the thickness T of the outer peripheral side wall 102 may preferably be 1.0 mm or less, and more preferably 0.7 mm or less, and still more preferably 0.5 mm or less. Here, the thickness T of the outer peripheral side wall 102 is defined as a thickness of the outer peripheral side wall 102 in the normal direction relative to a tangential line of the outer peripheral side wall 102 at a position to measure the thickness of the outer peripheral side wall 102, when observed at a cross section perpendicular to the flow path direction of the cells. FIG. 1 exemplarily shows the position to measure the thickness T of the outer peripheral side wall 102.

The partition walls 110 may be porous. The porosity of each partition wall 110 may preferably be from 35 to 60%, and more preferably from 35 to 45%. If the porosity is less than 35%, increased deformation may occur during firing. If the porosity is more than 60%, the strength of the honeycomb structure may be decreased. The porosity is a value measured by a mercury porosimeter.

The mean pore diameter of the partition walls 110 of the honeycomb structure portion 101 may preferably be from 2 to 15 µm, and more preferably from 4 to 8 µm. If the mean pore diameter is smaller than 2 µm, the electrical resistivity may become too high. If the mean pore diameter is larger than 15 µm, the electrical resistivity may become too small. The mean pore diameter is a value measured by a mercury porosimeter.

(1-2 Electrode Layer)

The pair of electrode layers 112a, 112b may be preferably disposed so as to be opposed to each other on the outer surface 109 of the outer peripheral side wall 102 across the central axis O of the honeycomb structure portion 101. More particularly, in the cross section perpendicular to the flow path direction of the cells 108, an angle θ (0°≤θ≤180° formed by two line segments extending from the respective circumferential centers of the pair of electrode layers 112a, 112b to the central axis O of the honeycomb structure portion 101 may preferably be 150°≤θ≤180°, and more preferably 160°≤θ≤180°, and even more preferably 170°≤θ≤180°, and most preferably 180°.

There is no particular restriction on the forming region of each electrode layer, but each of the electrode layers 112a, 112b may be preferably in the form of a band extending in the circumferential direction of the outer peripheral side wall 102 and the flow path direction of the cells on the outer surface 109 of the outer peripheral side wall 102, in terms of improving uniform heat generation of the honeycomb structure portion 101. More particularly, it is desirable that each of the electrode layers 112a, 112b extends over 80% or more, preferably over 90% or more, and more preferably over the full length of the length between both bottom surfaces of the honeycomb structure portion 101, from the viewpoint that the current tends to easily spread in the axial direction of the electrode layers 112a, 112b.

Referring now to FIG. 1, in the cross section perpendicular to the flow direction of the cells, a central angle α formed by the two line segments connecting the both side ends of respective electrode layers 112a, 112b in the circumferential direction to the central axis O may preferably be 30° or more, and more preferably 40° or more, and still more preferably 60° or more, in terms of spreading the current in the circumferential direction to enhance the uniform heat generation. However, if the central angle α is too large, the current passing through the inside of the honeycomb structure portion 101 will be decreased, and the current passing near the outer peripheral side wall 102 will be increased. Therefore, the central angle α may preferably be 140° or less, and more preferably 130° or less, and still more preferably 120° or less, in terms of the uniform heat generation of the honeycomb structure portion 101.

The thickness of each of the electrode layer 112a, 112b may preferably be from 0.01 to 5 mm, and more preferably from 0.01 to 3 mm. Such a range can allow improvement of the uniform heat generation. If the thickness of each of the electrode layers 112a, 112b is less than 0.01 mm, the electric resistance will be increased so that uniform heat generation may not be possible. If the thickness is more than 5 mm, breakage may occur during canning. When a measured position of each electrode layer is viewed from the cross section perpendicular to the flow path direction of the cells, the thickness of each of the electrode layers 112a, 112b is defined as a thickness in a normal direction relative to a tangential line of the outer surface at the measured position.

By setting the electric resistivity of each of the electrode layer 112a, 112b so as to be lower than the electric resistivity of the honeycomb structure portion 101, electricity preferentially flows to the electrode layers, and electricity tends to easily spread in the flow path direction of the cells and in the circumferential direction when electricity is supplied. The electric resistivity of each of the electrode layers 112a, 112b may preferably be 1/10 or less, and more preferably 1/20 or less, and even more preferably 1/30 or less, of the electric resistivity of the honeycomb structure portion 101. However, if the difference between the electric resistivities of both is too large, the current will concentrate between the end portions of the opposing electrode layers and the heat generation of the honeycomb structure portion will be biased, so that the electric resistivity of each of the electrode layers 112a, 112 b may preferably be 1/200 or more, and more preferably 1/150 or more, and still more preferably 1/100 or more, of the electric resistivity of the honeycomb structure portion 101. In the present invention, the electric resistivity of each of the electrode layers 112a, 112b is defined as a value measured at 400° C. by a four-terminal method.

Metals and conductive ceramics can be used for forming each of the electrode layers 112a, 112b. Examples of the metals include elementary metals of Cr, Fe, Co, Ni, Si or Ti or alloys containing at least one metal selected from the group consisting of these metals. Non-limiting examples of the conductive ceramics include silicon carbide (SiC), metal compounds such as metal silicides including tantalum silicide ($TaSi_2$) and chromium silicide ($CrSi_2$), and further composite materials (cermet) comprised of a combination of at least one of the conductive ceramics as listed above and at least one of the metals as listed above. Specific examples of the cermet include composite materials of metallic silicon and silicon carbide, composite materials of metal silicides such as tantalum silicide or chromium silicide and metallic silicon and silicon carbide, and composite materials obtained by adding one or more of insulating ceramics such as alumina, mullite, zirconia, cordierite, silicon nitride and aluminum nitride to one or more of the above metals in terms of reduction of thermal expansion. It is preferable that the material of each of the electrode layers 112a, 112b can be a combination of the composite materials of metal silicides such as tantalum silicide and chromium silicide and metallic silicon and silicon carbide, among the various metals and conductive ceramics as listed above, because it can be fired at the same time as the honeycomb structure portion, so that it can contribute to simplification of the production steps.

If there is a larger difference in the coefficient of thermal expansion between the electrode layers 112a, 112b and the metal terminals 103a, 103b, cracks may be possibly generated in the electrode layers 112a, 112b due to thermal stress. Therefore, each of the electrode layers 112a, 112b may preferably include a stress relaxation layer for relieving the thermal stress caused by the difference in the coefficient of thermal expansion from the metal terminals 103a, 103b. This will allow suppression of cracks in the electrode layers generated when welding the metal terminals to the electrode layers or due to repeated fatigue of thermal cycling. Conversely, if there is a sufficiently smaller difference in the coefficient of thermal expansion between the electrode layers 112a, 112b and the metal terminals 103a, 103b, for example, if the difference is $3 \times 10^{-6}$ (1/K) or less, and preferably $2 \times 10^{-6}$ (1/K) or less, and more preferably $1 \times 10^{-6}$ (1/K) or less, it is not necessary to provide the stress relaxation layer.

FIG. 4 shows an example of a stacked structure of the electrode layers of the honeycomb structure according to the present invention. In the example shown in FIG. 4, the electrode layer 112a (112b) has a stacked structure including a first electrode layer 112a-1 (112b-1) that is in contact with the outer surface 109 of the outer peripheral side wall 102 of the honeycomb structure portion; and a second electrode layer 112a-2 (112b-2) that is in contact with the metal terminals 103a (103b); and the second electrode layer 112a-2 (112b-2) is the stress relaxation layer. In the embodiment shown in FIG. 4, the second electrode layer 112a-2 (112b-2) is formed directly on the first electrode layer 112a-1 (112b-1). The covered region of the second electrode layer may be the same as the covered region of the first electrode layer, that is, may cover the entire first electrode layer, but the second electrode layer 112a-2 (112b-2) may be at least formed at positions where the metal terminals are welded, considering that the role of the second electrode layer is stress relaxation. Therefore, it is preferable that the covered region of the second electrode layer be smaller than that of the first electrode layer, in terms of production costs.

The means for achieving the stress relaxation layer is not limited as long as it can have the function of relaxing the thermal stress between the first electrode layers 112a-1, 112b-1 and the metal terminals 103a, 103b. For example, the means can be achieved by adjusting the coefficient of thermal expansion and/or Young's modulus of the second electrode layer 112a-2 (112b-2). When the electrode layers are made of a composite material of metal and ceramic, the coefficient of thermal expansion can be raised by increasing the mixing ratio of the metal, and on the contrary, it can be reduced by decreasing the mixing ratio of the metal. Further, the Young's modulus can be raised by decreasing the porosity, and on the contrary, it can be reduced by increasing the porosity.

For example, when a relational expression of A<B<C is satisfied, in which A represents a coefficient of thermal expansion of the first electrode layer 112a-1 (112b-1), B represents a coefficient of thermal expansion of the second electrode layer 112a-2 (112b-2) and C represents a coefficient of thermal expansion of the metal terminal 103a (103b), the second electrode layer 112a-2 (112b-2) can function as the stress relaxation layer. In a preferred embodiment, a relational expression of (3A+C)/4<B<(A+3C)/4 may be satisfied, and in a more preferred embodiment, a relational expression of (2A+C)/3<B<(A+2C)/3 may be satisfied.

In the present invention, the coefficient of thermal expansion (CTE) of each electrode layer means a coefficient of thermal expansion from 25° C. to 800° C. as measured in accordance with the standard JIS R 1618: 2004. In the present invention, the coefficient of thermal expansion (CTE) of each metal terminal refers to a coefficient of thermal expansion from 25° C. to 800° C. as measured in accordance with the standard JIS Z 2285: 2003. If it is difficult to cut out a test piece from the honeycomb structure, a test piece made of the same material as the part of the honeycomb structure to be measured for the coefficient of thermal expansion may be separately prepared, and the coefficient of thermal expansion of the test piece may be then measured.

Further, the second electrode layer 112a-2 (112b-2) can also function as the stress relaxation layer by lowering the Young's modulus. The Young's modulus of each second electrode layer may preferably be 50 GPa or less, and more preferably 45 GPa or less, and still more preferably 35 GPa or less. However, the Young's modulus of each second electrode layer may preferably be 2 GPa or more, and more preferably 3 GPa or more, and still more preferably 4 GPa or more, in order to maintain the strength.

In the present invention, the Young's modulus of each electrode layer is measured by the following procedure: a test piece made of the same material as that of the electrode layer is prepared, and bending strength of the test piece is measured according to a four point bending strength test method defined in the standard JIS R1601: 2008, and a "stress-strain curve" is created from the measured results. A slope of the "stress-strain curve" thus obtained is calculated, and the slope of the "stress-strain curve" is defined as the Young's modulus.

Each electrode layer preferably may have a relational expression of $t_2 \geq 0.1$ mm, and more preferably $t_2 \geq 0.15$ mm, and even more preferably $t_2 \geq 0.2$ mm, in which t represents a thickness of the second electrode layer 112a-1 (112b-2), in terms of effectively exhibiting the stress relaxation ability. However, if the thickness of the second electrode layer is too thick, stress will concentrate on the end portions (steps) of the second electrode layer and cracks will tend to be generated in the first electrode layer or the outer peripheral side wall of the honeycomb structure portion. Therefore, it preferably may have $t_2 \leq 2$ mm, and more preferably $t_2 \leq 1.5$ mm, and even more preferably $t_2 \leq 1$ mm, in terms of suppression of the cracks.

(1-3 Metal Terminal)

A pair of metal terminals 103a, 103b is joined to the respective electrode layers 112a, 112b via one or more welded portions 120 (see FIG. 2). By reducing the welded area of the welded portion 120 per portion, cracking and separation due to the thermal expansion difference can be suppressed. Specifically, the welded area of one welded portion 120 may preferably be 50 mm$^2$ or less, and more preferably 45 mm$^2$ or less, and even more preferably 40 mm$^2$ or less, and still more preferably 30 mm$^2$ or less. However, since the joint strength cannot be maintained if the welded area of one welded portion 120 is too small, the welded area may preferably be 2 mm$^2$ or more, and more preferably 3 mm$^2$ or more, and still more preferably 4 mm$^2$ or more.

In the present invention, the welded area of one welded portion can be measured by separating the metal terminal from the electrode layer and exposing the welded portion (the molten area on the metal terminal side) of the metal terminal to the electrode layer. For example, the metal terminal or a reference plate made of the same material as that of the metal terminal is photographed for a predetermined area (e.g., 1 mm$^2$) and converted into image data, and the number of pixels of the image is then extracted by an image processing software (for example, product name "Photoshop" available from Adobe Corporation) to define the number of pixels per unit area. Then, under the same conditions as those, the exposed welded portion is photographed and converted into image data, and the number of pixels of the welded portion is extracted in the same way. The area corresponding to the number of pixels is calculated from the previously defined number of pixels per unit area, and this is defined as the welded area.

Depending on the sizes of the metal terminals 103a, 103b, two or more welded portions 120 can be formed to increase the total welded area, so that the joint strength can be improved. Specifically, the total welded area of one or more welded portions for each metal terminal may preferably be 2 mm$^2$ or more, and more preferably 3 mm$^2$ or more, and still more preferably 4 mm$^2$ or more. On the other hand, if the total welded area is excessively increased, the thermal shock resistance will tend to deteriorate. Therefore, in terms of ensuring the thermal shock resistance, the total welded area of one or more welded portions for each metal terminal may preferably be 120 mm$^2$ or less, and more preferably 110 mm$^2$ or less, and even more preferably 100 mm$^2$ or less.

Further, if there are two or more welded portions 120 for each metal terminal, a distance between the adjacent welded portions may be preferably maintained at a certain level or more, depending on the welded areas of the welded portions, in terms of increasing the joint strength while maintaining the thermal shock resistance. More particularly, it is preferable that a relationship of $P \geq \{(A_1+A_2)/2\}/10$ is satisfied, in which $A_1$ and $A_2$ each represents a welded area of the adjacent welded portions, and P represents a distance between the adjacent welded portions. That is, the adjacent welded portions may preferably maintain a distance of 1/10 or more of the average value of the welded areas of both. The relationship of $P \geq \{(A_1+A_2)/2\}/5$ may be preferably satisfied, and the relationship $P \geq \{(A_1+A_2)/2\}/3.5$ may be more preferably satisfied, and the relationship of $P \geq \{(A_1+A_2)/2\}/2.5$ may be still more preferably satisfied. Even if the distance between the welded portions is larger, there is no particular problem and the distance may be set appropriately in consideration of the size of the metal terminal.

Here, the distance P between the adjacent welded portions 120 refers to a length of a portion where both welded portions are not present, within a line segment L connecting centers of gravity between the welded portion in question and the welding portion closest thereto (See FIG. 2). Further, the distance P is measured based on molten areas on a laser-irradiated surface without separating the metal terminals.

The material of each metal terminal is not particularly limited as long as it is a metal, and may use either an elementary metal or an alloy. Preferably, it may be, for example an alloy containing at least one selected from the group consisting of Cr, Fe, Co, Ni and Ti, and more preferably stainless steel and a Fe—Ni alloy, in terms of the corrosion resistance, electric resistivity and coefficient of thermal expansion.

The shapes and sizes of the metal terminals 103a, 103b are not particularly limited and may be appropriately set so as to fulfill the above welded conditions, but the surfaces to be joined to the electrode layers 112a, 112b are preferably allowed to coincide with the surface shapes of the electrode layers 112a, 112b (in other words, the outer surface shapes of the outer peripheral side wall on which the electrode layers are formed), such that the surfaces to be joined can be brought into close contact with the electrode layers 112a, 112b, in terms of increasing the joint strength.

Further, any excessively larger thickness of the welded portions of the metal terminals 103a, 103b requires time for welding and increases an amount of heat applied to the terminals, so that strain will tend to occur. Therefore, the thickness may preferably be 5 mm or less, and more preferably 4 mm or less, and still more preferably 3 mm or less. If the thickness of the welded portions of the metal terminals 103a, 103b is too small, the strength of the terminals cannot be maintained. Therefore, the thickness may preferably be 0.1 mm or more, and more preferably 0.2 mm or more, and even more preferably 0.3 mm or more.

<2. Method for Producing Conductive Honeycomb Structure>

Next, a method for producing the conductive honeycomb structure according to the present invention will be exemplarily described. In one embodiment, the method for producing the honeycomb structure according to the present invention includes a step A1 of obtaining an unfired honeycomb structure portion provided with an electrode layer forming paste and a step A2 of firing the unfired honeycomb structure portion provided with the electrode layer forming paste to obtain a honeycomb structure, and a step A3 of welding metal terminals to the honeycomb structure.

In the step A1, a honeycomb formed body, which is a precursor of the honeycomb structure portion, is produced and an electrode layer forming paste is applied to the side surface of the honeycomb formed body to obtain an unfired honeycomb structure portion provided with the electrode layer forming paste. The honeycomb formed body can be produced in accordance with a method for making a honeycomb formed body in the known method for producing the honeycomb structure. For example, firstly, a molding material is prepared by adding to silicon carbide powder (silicon carbide), metallic silicon powder (metallic silicon), at least one binder, at least one surfactant, at least one pore former, water and the like. The mass of metallic silicon may preferably be from 10 to 40% by mass relative to the total mass of silicon carbide powder and metallic silicon. The mean particle diameter of the silicon carbide particles in the silicon carbide powder may preferably be from 3 to 50 μm, and more preferably from 3 to 40 μm. The mean particle diameter of metallic silicon (metallic silicon powder) may preferably be from 2 to 35 μm. Each mean particle diameter of the silicon carbide particles and metallic silicon (metallic silicon particles) refers to an arithmetic mean diameter on volume basis when frequency distribution of the particle size is measured by a laser diffraction method. The silicon carbide particles are fine particles of silicon carbide forming the silicon carbide powder, and the metallic silicon particles are fine particles of metallic silicon forming the metal silicon powder. It should be noted that this is the formulation of the molding material when the material of the honeycomb structure is the silicon-silicon carbide based composite material, and no metallic silicon is added when the material of the honeycomb structure is silicon carbide.

Examples of the binder include methyl cellulose, hydroxypropyl methyl cellulose, hydroxypropoxyl cellulose, hydroxyethyl cellulose, carboxymethyl cellulose, polyvinyl alcohol, and the like. Among them, it is preferable to use methyl cellulose in combination with hydroxypropoxyl cellulose. The content of the binder may preferably be from 2.0 to 10.0 parts by mass when the total mass of the silicon carbide powder and the metallic silicon powder is 100 parts by mass.

The content of water may preferably be from 20 to 60 parts by mass when the total mass of the silicon carbide powder and the metallic silicon powder is 100 parts by mass.

Examples of the surfactant that can be used include ethylene glycol, dextrin, fatty acid soap, polyalcohol and the like. These may be used alone or in combination with two or more. The content of the surfactant may preferably be from 0.1 to 2.0 parts by mass when the total mass of the silicon carbide powder and the metallic silicon powder is 100 parts by mass.

The pore former is not particularly limited as long as it will form pores after firing, and includes, for example, graphite, starches, foaming resins, water absorbing resins, silica gel and the like. The content of the pore former may preferably be from 0.5 to 10.0 parts by mass when the total mass of the silicon carbide powder and the metallic silicon powder is 100 parts by mass. The mean particle diameter of the pore former may preferably be from 10 to 30 µm. If it is smaller than 10 µm, pores may not be formed sufficiently. If it is larger than 30 µm, the pore former may generate clogging of a die during molding. The mean particle diameter of the pore former refers to an arithmetic mean diameter on volume basis when the frequency distribution of the particle size is measured by the laser diffraction method. When the pore former is the water absorbing resin, the mean particle diameter of the pore former refers to the mean particle diameter after water absorption.

Subsequently, the resulting molding material is kneaded to form a green body, and the green body is then subjected to extrusion molding to prepare a honeycomb formed body. In the extrusion molding, a die having a desired overall shape, cell shape, partition wall thickness, cell density and the like can be used. Preferably, the resulting honeycomb formed body is then subjected to drying. When the length in the central axis direction of the honeycomb formed body is not a desired length, both the bottom portions of the honeycomb formed body can be cut to the desired length. The dried honeycomb formed body is referred to as a honeycomb dried body.

An electrode layer forming paste for forming electrode layers is then prepared. The electrode layer forming paste can be formed by suitably adding various additives to raw material powder (metal powder, ceramic powder, and the like) blended according to the required characteristics of the electrode layers and kneading them. When the electrode layer has a stacked structure, the joint strength between the metal terminals and the electrode layers tends to be improved by increasing the mean particle diameter of the metal powder in the paste for the second electrode layer, as compared with the mean particle diameter of the metal powder in the paste for the first electrode layer. The mean particle diameter of the metal powder refers to an arithmetic mean diameter on volume basis when the frequency distribution of the particle size is measured by the laser diffraction method.

The resulting electrode layer forming paste is applied onto the side surface of the honeycomb formed body (typically, the honeycomb dried body) to obtain an unfired honeycomb structure portion with the electrode layer forming paste. The method for preparing the electrode layer forming paste and the method for applying the electrode layer forming paste onto the honeycomb formed body can be carried out according to the known method for producing the honeycomb structure. In this case, to provide lower electric resistivity of the electrode layers than that of the honeycomb structure portion, the content ratio of the metal may be increased as compared with the honeycomb structure portion or the particle diameter of the metal particles may be reduced.

As a variation of the method for producing the honeycomb structure, in the step A1, the honeycomb formed body may be fired before applying the electrode layer forming paste. That is, in such a variation, the honeycomb formed body is fired to produce a honeycomb fired body, and the electrode portion forming paste is then applied to the honeycomb fired body.

In the step A2, the unfired honeycomb structure portion provided with the electrode layer forming paste is fired to obtain a honeycomb structure. Before carrying out the firing, the unfired honeycomb structure portion provided with the electrode layer forming paste may be dried. Further, before the firing, degreasing may be performed in order to remove the binder and the like. The firing may be preferably carried out by heating the honeycomb formed body in an inert atmosphere such as nitrogen or argon at 1400 to 1500° C. for 1 to 20 hours. After the firing, an oxidation treatment may be preferably carried out at 1200 to 1350° C. for 1 to 10 hours in order to improve the durability. The degreasing and firing methods are not particularly limited, and may be carried out using an electric furnace, a gas furnace or the like.

In the step A3, a pair of metal terminals is welded onto the electrode layers of the honeycomb structure. Welding conditions may be appropriately set so as to fulfill the conditions with regard to the welded area and the distance between the adjacent welded portions mentioned earlier. Non-limiting examples of the welding method include, preferably, laser welding from the metal terminal side, in terms of control of the welded area and production efficiency. The laser output in this case may be, for example, from 0.2 to 20 $kW/mm^2$, although it depends on the material and thickness of the metal terminals.

EXAMPLES

Hereinafter, Examples will be illustrated for better understanding of the present invention and its advantages, but the present invention is not limited to the Examples.

Example 1

(1. Preparation of Columnar Green Body)

A ceramic raw material was prepared by mixing silicon carbide (SiC) powder and metallic silicon (Si) powder at a mass ratio of 80:20. To the ceramic raw material were added hydroxypropylmethyl cellulose as a binder and a water absorbing resin as a pore former, as well as water, to form a molding material. The molding material was then kneaded by a vacuum green body kneader to prepare a cylindrical green body. The content of the binder was 7 parts by mass when the total amount of silicon carbide (SiC) powder and metallic silicon (Si) powder was 100 parts by mass. The content of the pore former was 3 parts by mass when the total amount of silicon carbide (SiC) powder and metallic silicon (Si) powder was 100 parts by mass. The content of water was 42 parts by mass when the total amount of silicon carbide (SiC) powder and metallic silicon (Si) powder was 100 parts by mass. The mean particle diameter of silicon carbide powder was 20 µm and the mean particle diameter of metallic silicon powder was 6 µm. The mean particle diameter of the pore former was 20 µm. Each of the mean particle diameters of silicon carbide, metallic silicon and pore former refers to an arithmetic mean diameter on volume basis when the frequency distribution of particle size is measured by the laser diffraction method.

(2. Preparation of Honeycomb Dried Body)

The resulting columnar green body was molded using an extruder having a grid-like die structure to provide a cylindrical honeycomb formed body including cells each having a square shape in the cross section perpendicular to the flow path direction of the cells. The honeycomb formed body was dried by high frequency induction heating and then further dried at 120° C. for 2 hours by using a hot air drier, and predetermined amounts of both bottoms were cut to prepare a honeycomb dried body.

(3. Preparation of First Electrode Layer Forming Paste)

A first electrode layer forming paste was prepared by mixing tantalum silicide ($TaSi_2$) powder, metallic silicon (Si) powder, silicon carbide (SiC) powder, methylcellulose, glycerin and water using a planetary centrifugal mixer. The $TaSi_2$ powder, the Si powder and the SiC powder were blended such that that the volume ratio was $TaSi_2$ powder:Si powder:SiC powder=50:30:20. Further, based on the total 100 parts by mass of the $TaSi_2$ powder, the Si powder and the SiC powder, the content of methyl cellulose was 0.5 parts by mass, the content of glycerin was 10 parts by mass, and the content of water was 38 parts by mass. The mean particle diameter of the tantalum silicide powder was 7 μm. The mean particle diameter of the metallic silicon powder was 6 μm. The mean particle diameter of the silicon carbide powder was 35 μm. These mean particle diameters refer to arithmetic average diameters on volume basis when the frequency distribution of particle sizes is measured by the laser diffraction method.

(4. Preparation of Second Electrode Layer Forming Paste)

A second electrode layer forming paste was prepared by mixing chromium silicide ($CrSi_2$) powder, metallic silicon (Si) powder, methylcellulose, glycerin, and water using a planetary centrifugal mixer. Herein, the $CrSi_2$ powder and the Si powder were blended such that the volume ratio was $CrSi_2$ powder:Si powder=90:10. Further, based on the total 100 parts by mass of the $CrSi_2$ powder and the Si powder, the content of methyl cellulose was 0.5 parts by mass, the content of glycerin was 10 parts by mass, and the content of water was 38 parts by mass. The mean particle diameter of the chromium silicide powder was 7 μm. The mean particle diameter of the metallic silicon powder was 6 μm.

(5. Application of Electrode Layer Forming Paste)

The first electrode layer forming paste was applied onto the outer surface of the outer peripheral side wall of the honeycomb dried body at two positions so as to be opposed to each other across the central axis (θ=180° in FIG. 1). Each applied portion was formed in the form of a band over the full length between both bottom surfaces of the honeycomb dried body such that the central angle α was 90° in the cross section perpendicular to the flow path direction of the cells. The second electrode layer forming paste was then applied only to the regions required for welding the metal terminals so as to partially cover the applied portions of the first electrode layer forming paste. The honeycomb dried body after application of the first and second electrode layer forming pastes was dried at 120° C. to obtain an unfired honeycomb structure portion provided with the electrode layer forming paste.

(6. Firing)

The unfired honeycomb structure portion provided with the electrode layer forming paste was then degreased in the atmosphere at 550° C. for 3 hours. The degreased and unfired honeycomb structure portion with the electrode layer forming paste was fired and oxidized to prepare a honeycomb structure. The firing was carried out in an argon atmosphere at 1450° C. for 2 hours. The oxidation treatment was carried out in the atmosphere at 1300° C. for 1 hour.

The honeycomb structure had circular bottom surfaces each having a diameter of 100 mm and a height (a length in the flow path direction of the cells) of 120 mm. The cell density was 93 cells/cm$^2$, the thickness of each partition wall was 101.6 μm, the porosity of the partition walls was 45%, and the mean pore diameter of the partition walls was 8.6 μm. The thicknesses of the first electrode layer and the second electrode layer were as shown in Table 1. The electrical resistivities at 400° C. of the honeycomb structure portion, the first electrode layer and the second electrode layer were measured by the four-terminal method using test pieces made of the same materials as those of the honeycomb structure portion, the first electrode layer and the second electrode layer, and found that they were 5 Ωcm, 0.01 Ωcm, and 0.001 Ωcm, respectively.

(7. Welding of Metal Terminal)

Each of plate-shaped metal terminals (dimension: 30 mm×50 mm×0.5 mmt) made of SUS was welded onto the second electrode layer of each electrode layer of the honeycomb structure obtained under the above producing conditions by irradiating the each metal terminal side with laser in a dotted or linear manner under the conditions as shown in Table 1 according to the test number, using a fiber laser welding machine. When irradiated in the linear manner, the line width was 2 mm. Each metal terminal was used after each metal terminal was beforehand subjected to bending along the curved surface of the outer peripheral side wall of the honeycomb structure. Laser irradiation conditions were such that a laser output was 1 kW, and a laser output/beam area was about 0.6 kW/mm$^2$. Welding conditions of the metal terminals to the respective electrode layers were identical.

In Table 1, the expression "Number of Welded Portions (Number/Each Side)" means the number of welded portions in each electrode layer. The expression "Distance between Welded Portions" means the distance P between the adjacent welded portions where two or more welded portions were present (see FIG. 2). The expression "One Welded Area" refers to the welded area per portion. The expression "Total Welded Area per Terminal" refers to the total welded area of each of the pair of metal terminals. The definition of "$\{(A_1+A_2)/2\}/10$" is as described above and is calculated when two or more welded portions are present. In this case, since in Examples and Comparative Examples illustrated herein, the welded areas at the respective welded portions are identical and $A_1$ equals $A_2$.

(8. Presence or Absence of Cracks during Welding)

Whether or not cracks were generated near the welded portions of the honeycomb structure during the welding of the metal terminals under the above conditions was investigated by means of a magnifying glass at a magnification of 40. Cases where No crack was generated was indicated as "None", and cases where crack was generated was indicated as "Cracked". The results are shown in Table 1.

(9. Joint Strength Test)

Each metal terminal welded under the above conditions was separated according to the peel test of JIS Z 3144: 2013, and the peeled portion was examined for all of the welded portions. For each test example, when the peeling of all the welded portions was accompanied with breakage of the honeycomb structure portion or the electrode layer, it was determined to have a high joint strength at the boundary surface between the metal terminal and the electrode layer, which was indicated as "OK". On the other hand, when the peeling was not accompanied with breakage of the honeycomb structure portion or the electrode layer and there was at least one welded portion generated at the boundary surface between the metal terminal and the electrode layer, it was determined to have a low joint strength at the boundary surface between the metal terminal and the electrode layer, which was indicated as "NG". The results are shown in Table 1.

(10. Thermal Shock Resistance Test)

The honeycomb structure provided with the metal terminals obtained under the above producing conditions was subjected to a heating and cooling test using "a propane gas burner testing apparatus equipped with a metal case for housing the honeycomb structure and a propane gas burner that can supply a heated gas into the metal case". The heated gas was a combustion gas generated by burning a propane gas with the gas burner (the propane gas burner). Thermal shock resistance was then evaluated by confirming whether or not crack was generated in the honeycomb structure according to the above heating and cooling test. More particularly, first, the resulting honeycomb structure was housed (canned) in the metal case of the propane gas burner testing apparatus. The gas (combustion gas) heated by the propane gas burner was supplied into the metal case so as to pass through the inside of the honeycomb structure. A temperature condition (an inlet gas temperature condition) of the heated gas flowing into the metal case was set as follows: first, the temperature was raised to 900° C. in 5 minutes, maintained at 900° C. for 10 minutes, then cooled to 100° C. in 5 minutes, maintained at 100° C. for 10 minutes, and then cooled to room temperature. Then, the presence or absence of crack in the outer peripheral side wall of the honeycomb structure were visually confirmed. If no crack was confirmed, it was determined that the tested honeycomb structure passed the thermal shock resistance test. The results are shown in Table 1. A case where no crack was observed in four or more of five samples was indicated as "OK", and a case where cracks were observed in two or more of five samples was indicated as "NG".

(11. Linear Coefficient of Thermal Expansion)

The linear coefficient of thermal expansion (CTE) of each of the first electrode layer and the second electrode layer was measured by the following method. Samples of the first electrode layer and the second electrode layer for measuring the linear coefficient of thermal expansion were prepared by cutting them out of the honeycomb structure provided with the metal terminals obtained under the above producing conditions. The size of each sample was a height of 0.2 mm×a width of 4 mm×a length of 50 mm. The linear coefficient of thermal expansion from 25° C. to 800° C. of each sample prepared was measured in accordance with the standard JIS R 1618: 2004 using a thermal expansion coefficient measuring device "TD 5000 S (trade name)" available from Bruker AXS GmbH. The measured value was determined to be the coefficient of thermal expansion ($\times 10^{-6}$ (1/K)) of each of the first electrode layer and the second electrode layer. The results are shown in Table 1. Further, a part of the outer peripheral side wall was cut out from the honeycomb structure and the coefficient of thermal expansion was measured by the same procedure, demonstrating that the coefficient of thermal expansion was $4.5 \times 10^{-6}$ (1/K).

The coefficient of thermal expansion (CTE) of each metal terminal was measured by the following method. A metal made of the same material as that of each metal terminal welded to the honeycomb structure was processed to prepare a measuring sample having a height of 0.2 mm×a width of 4 mm×a length of 50 mm. The coefficient of thermal expansion from 25° C. to 800° C. of each measuring sample prepared was measured in accordance with the standard JIS Z 2285: 2003 using a thermal expansion coefficient measuring device "TD 5000 S (trade name)" available from Bruker AXS GmbH. The measured value was determined to be the coefficient of thermal expansion of each metal terminal ($\times 10^{-6}$ (1/K)). The results are shown in Table 1.

(12. Young's Modulus)

Young's modulus of each of the first electrode layer and the second electrode layer was measured by the following procedure. Each test piece made of the same material as that of each of the first electrode layer and the second electrode layer electrode layer was prepared and the bending strength of each test piece was measured according to a four-point bending strength test method defined in the standard JIS R1601: 2008. A "stress-strain curve" was created from the measurement results. A slope of the "stress-strain curve" thus obtained was calculated, and the slope of the "stress-strain curve" was determined to be the Young's modulus.

Examples 2 to 19, Comparative Examples 1 to 3

A honeycomb dried body was prepared in the same procedure as in Example 1. Preparation of an electrode layer forming paste, application of the electrode layer forming paste, firing and welding of metal terminals were then carried out by the same procedure as in Example 1 to produce a honeycomb structure provided with the metal terminals, with exception that the electrode layer conditions and the welding conditions were changed to those shown in Table 1 according to the test numbers.

The linear coefficient of thermal expansion (CTE) of the second electrode layer was adjusted by changing the content ratios of chromium silicide ($CrSi_2$) powder and metallic silicon (Si) powder. The coefficient of thermal expansion is raised by increasing the content ratio of $CrSi_2$, and conversely it is reduced by decreasing the content ratio of $CrSi_2$, as compared with Example 1.

Example 20

An unfired honeycomb structure portion with an electrode layer forming paste was obtained in the same method as in Example 1, with the exception that the volume ratios of $TaSi_2$ powder, Si powder and SiC powder in the first electrode layer forming paste were changed to $TaSi_2$ powder:Si powder:SiC powder=40:40:20, and the thickness of the first electrode layer was changed as shown in Table 1, and the second electrode layer was not formed. The unfired honeycomb structure portion with the electrode layer forming paste was then degreased, fired and oxidized under the same conditions as in Example 1 to obtain a honeycomb structure. Laser welding was performed on the first electrode layer under the conditions as shown in Table 1 by the same procedure as in Example 1 to produce a honeycomb structure provided with metal terminals, with the exception that the material of the metal terminals was changed to Invar® (Fe—Ni alloy).

The honeycomb structure provided with the metal terminals according to each test example was subjected to investigation of the presence or absence of crack during welding, investigation of the presence or absence of terminal separation, the thermal shock resistance test, measurements of the coefficient of thermal expansion and Young's modulus, according to the same methods as in Example 1. The results are shown in Table 1.

TABLE 1

| Test Number | Number of Welded Portions [Number/ Each Side] | Welded Portion Shape | Welded Portion Arrangement | Distance between Welded Portions [mm] | One Welded Area [mm$^2$] | Total Welded Area per Terminal [mm$^2$] | $\{(A_1 + A_2)/2\}/10$ |
|---|---|---|---|---|---|---|---|
| Example 1 | 1 | Dotted | — | — | 2 | 2 | — |
| Example 2 | 1 | Linear | — | — | 20 | 20 | — |
| Example 3 | 1 | Linear | — | — | 50 | 50 | — |
| Example 4 | 20 | Dotted | Staggered | 2 | 2 | 40 | 0.2 |
| Example 5 | 20 | Dotted | Staggered | 0.2 | 2 | 40 | 0.2 |
| Example 6 | 60 | Dotted | Staggered | 0.2 | 2 | 120 | 0.2 |
| Example 7 | 5 | Linear | Parallel | 10 | 20 | 100 | 2 |
| Example 8 | 5 | Linear | Parallel | 2 | 20 | 100 | 2 |
| Example 9 | 2 | Linear | Parallel | 20 | 50 | 100 | 5 |
| Example 10 | 2 | Linear | Parallel | 5 | 50 | 100 | 5 |
| Example 11 | 3 | Linear | Parallel | 5 | 30 | 90 | 3 |
| Example 12 | 2 | Linear | Parallel | 5 | 40 | 80 | 4 |
| Example 13 | 5 | Linear | Parallel | 10 | 20 | 100 | 2 |
| Example 14 | 5 | Linear | Parallel | 1 | 20 | 100 | 2 |
| Example 15 | 2 | Linear | Parallel | 3 | 50 | 100 | 5 |
| Example 16 | 7 | Linear | Parallel | 2 | 20 | 140 | 2 |
| Example 17 | 3 | Linear | Parallel | 5 | 50 | 150 | 5 |
| Example 18 | 5 | Linear | Parallel | 10 | 20 | 100 | 2 |
| Example 19 | 5 | Linear | Parallel | 10 | 20 | 100 | 2 |
| Example 20 | 1 | Linear | — | — | 20 | 20 | — |
| Comparative Example 1 | 1 | Dotted | — | — | 1 | 1 | — |
| Comparative Example 2 | 10 | Dotted | Staggered | 1 | 1 | 10 | 0.1 |
| Comparative Example 3 | 1 | Linear | Parallel | — | 60 | 60 | — |

| Test Number | CTE of First Electrode Layer [×10$^{-6}$ (1/k)] | Thickness of First Electrode Layer [mm] | Young's Modulus of First Electrode Layer [GPa] | CTE of Second Electrode Layer [×10$^{-6}$ (1/k)] | Thickness of Second Electrode Layer [mm] | Young's Modulus of Second Electrode Layer [GPa] | CTE of Metal Terminal [×10$^{-6}$ (1/K)] | Thickness of Metal Terminal [mm] |
|---|---|---|---|---|---|---|---|---|
| Example 1 | 7 | 0.25 | 20 | 10 | 0.5 | 25 | 12 | 0.5 |
| Example 2 | 7 | 0.25 | 20 | 10 | 0.5 | 25 | 12 | 0.5 |
| Example 3 | 7 | 0.25 | 20 | 10 | 0.5 | 25 | 12 | 0.5 |
| Example 4 | 7 | 0.25 | 20 | 10 | 0.5 | 25 | 12 | 0.5 |
| Example 5 | 7 | 0.25 | 20 | 10 | 0.5 | 25 | 12 | 0.5 |
| Example 6 | 7 | 0.25 | 20 | 10 | 0.5 | 25 | 12 | 0.5 |
| Example 7 | 7 | 0.25 | 20 | 10 | 0.5 | 25 | 12 | 0.5 |
| Example 8 | 7 | 0.25 | 20 | 10 | 0.5 | 25 | 12 | 0.5 |
| Example 9 | 7 | 0.25 | 20 | 10 | 0.5 | 25 | 12 | 0.5 |
| Example 10 | 7 | 0.25 | 20 | 10 | 0.5 | 25 | 12 | 0.5 |
| Example 11 | 7 | 0.25 | 20 | 10 | 0.5 | 25 | 12 | 0.5 |
| Example 12 | 7 | 0.25 | 20 | 10 | 0.5 | 25 | 12 | 0.5 |
| Example 13 | 7 | 0.25 | 20 | 9 | 0.5 | 25 | 12 | 0.5 |
| Example 14 | 7 | 0.25 | 20 | 10 | 0.5 | 25 | 12 | 0.5 |
| Example 15 | 7 | 0.25 | 20 | 10 | 0.5 | 25 | 12 | 0.5 |
| Example 16 | 7 | 0.25 | 20 | 10 | 0.5 | 25 | 12 | 0.5 |
| Example 17 | 7 | 0.25 | 20 | 10 | 0.5 | 25 | 12 | 0.5 |
| Example 18 | 7 | 0.25 | 20 | 7 | 0.5 | 25 | 12 | 0.5 |
| Example 19 | 7 | 0.25 | 20 | 12 | 0.5 | 25 | 12 | 0.5 |
| Example 20 | 6 | 0.50 | 20 | — | — | — | 8 | 0.5 |
| Comparative Example 1 | 7 | 0.25 | 20 | 10 | 0.5 | 25 | 12 | 0.5 |
| Comparative Example 2 | 7 | 0.25 | 20 | 10 | 0.5 | 25 | 12 | 0.5 |
| Comparative Example 3 | 7 | 0.25 | 20 | 10 | 0.5 | 25 | 12 | 0.5 |

| Test Number | Joining Strength at Boundary Face | Crack during Welding | Thermal Shock Resistance (Number of OK/ Number of Evaluations) |
|---|---|---|---|
| Example 1 | OK | None | OK (5/5) |
| Example 2 | OK | None | OK (5/5) |
| Example 3 | OK | None | OK (5/5) |
| Example 4 | OK | None | OK (5/5) |
| Example 5 | OK | None | OK (5/5) |
| Example 6 | OK | None | OK (5/5) |
| Example 7 | OK | None | OK (5/5) |

TABLE 1-continued

| | | | |
|---|---|---|---|
| Example 8 | OK | None | OK (5/5) |
| Example 9 | OK | None | OK (5/5) |
| Example 10 | OK | None | OK (4/5) |
| Example 11 | OK | None | OK (5/5) |
| Example 12 | OK | None | OK (4/5) |
| Example 13 | OK | None | OK (5/5) |
| Example 14 | OK | None | NG |
| Example 15 | OK | None | NG |
| Example 16 | OK | None | NG |
| Example 17 | OK | None | NG |
| Example 18 | OK | None | NG |
| Example 19 | OK | None | NG |
| Example 20 | OK | None | OK (5/5) |
| Comparative Example 1 | NG | None | — |
| Comparative Example 2 | NG | None | — |
| Comparative Example 3 | OK | Cracked | — |

<Discussion>

In Examples 1 to 20 where the welded area of one welded portion was appropriate, no separation of the terminal was generated during welding and no crack was generated in the honeycomb structure. Particularly, in Examples 1 to 13 and 20 where the total welded area for each terminal, the distance between the welded portions and the coefficient of thermal expansion were appropriate, the thermal shock resistance was also excellent.

For example, in Example 8, the relationship of $P \geq \{(A_1+A_2)/2\}/10$ was satisfied, so that the thermal shock resistance was improved as compared with Example 14 in which one welded area and the total welded area per terminal were the same as those of Example 8. In each of Examples 9 and 10, the relationship of $P \geq \{(A_1+A_2)/2\}/10$ was satisfied, so that the thermal shock resistance was improved as compared with Example 15 in which one welded area and the total welded area per terminal were the same as those of Examples 9 and 10.

In Example 8, the total welded area per terminal was properly adjusted, so that the thermal shock resistance was improved, as compared with Example 16. In Example 10, the total welded area per terminal was properly adjusted, so that the thermal shock resistance was improved, as compared with Example 17.

In Example 7, the relationship of A<B<C was satisfied, in which A represents the coefficient of thermal expansion of the first electrode layer, B represents the coefficient of thermal expansion of the second electrode layer, and C represents the coefficient of thermal expansion of the metal terminal, so that the thermal shock resistance was improved as compared with Example 18 and Example 19.

On the other hand, in each of Comparative Example 1 and Comparative Example 2, the welded area of one welded portion was too small, so that the terminal was separated during welding. In Comparative Example 3, on the contrary, the welded area of one welded portion was too large, so that cracks were generated in the honeycomb structure during welding.

DESCRIPTION OF REFERENCE NUMERALS 100 conductive honeycomb structure
101 honeycomb structure portion
102 outer peripheral side wall
103a, 103b metal terminal
104 first bottom surface
106 second bottom surface
108 cell
109 outer surface
110 partition wall
112a, 112b electrode layer
116 protruding portion
117 upper surface of protruding portion
120 weld portion

What is claimed is:

1. A conductive honeycomb structure, comprising:
   a columnar ceramic honeycomb structure portion comprising an outer peripheral side wall and a plurality of partition walls each disposed inside the outer peripheral side wall and defining a plurality of cells penetrating from one bottom surface to another bottom surface to form flow paths;
   a pair of electrode layers disposed on an outer surface of the outer peripheral side wall across a central axis of the honeycomb structure portion; and
   a pair of metal terminals joined to the respective electrode layers via one or more welded portions,
   wherein each of the one or more welded portions comprises a welded area of from 2 to 50 mm$^2$.

2. The conductive honeycomb structure according to claim 1, wherein when two or more welded portions are present for each metal terminal, a relationship of $P \geq \{(A_1+A_2)/2\}/10$ is satisfied, in which $A_1$ and $A_2$ each represents the welded area of the welded portions adjacent to each other, and P represents a distance between the welded portions adjacent to each other.

3. The conductive honeycomb structure according to claim 1, wherein a total welded area of the one or more welded portions is 2 mm$^2$ or more and 120 mm$^2$ or less for each of the metal terminals.

4. The conductive honeycomb structure according to claim 1, wherein each electrode layer comprises a stacked structure comprising a first electrode layer that is in contact with the outer surface of the outer peripheral side wall of the honeycomb structure portion, and a second electrode layer that is in contact with one of the metal terminals, the second electrode layer being a stress relaxation layer.

5. The conductive honeycomb structure according to claim 4, wherein a relational expression of A<B<C is satisfied, in which A represents a coefficient of thermal expansion of the first electrode layer, B represents a coefficient of thermal expansion of the second electrode layer and C represents a coefficient of thermal expansion of the one of the metal terminals.

6. The conductive honeycomb structure according to claim 4, wherein the second electrode layer has a Young's modulus of from 2 to 50 GPa.

* * * * *